Sept. 13, 1966 D. W. JOHNSON 3,272,120
ADDRESS PRINTING MACHINES WITH ROLLER PLATENS
Filed Oct. 22, 1964 3 Sheets-Sheet 1

INVENTOR.
DEAN W. JOHNSON
BY
*Russell L. Root*
ATTORNEY.

Sept. 13, 1966      D. W. JOHNSON      3,272,120

ADDRESS PRINTING MACHINES WITH ROLLER PLATENS

Filed Oct. 22, 1964      3 Sheets-Sheet 2

INVENTOR.
DEAN W. JOHNSON
BY *Russell L. Root*
ATTORNEY.

INVENTOR.
DEAN W. JOHNSON
BY Russell L. Root
ATTORNEY.

United States Patent Office 3,272,120
Patented Sept. 13, 1966

3,272,120
ADDRESS PRINTING MACHINES WITH ROLLER PLATENS
Dean W. Johnson, Euclid, Ohio, assignor to Addressograph-Multigraph Corporation, Cleveland, Ohio, a corporation of Delaware
Filed Oct. 22, 1964, Ser. No. 405,673
7 Claims. (Cl. 101—56)

The present invention relates to a printing machine and more particularly to a data recorder for imprinting forms from embossed printing plates.

Data recorders are currently being used in a wide variety of applications for imprinting various types of forms, documents and the like. While these data recorders are basically the same in that they imprint from embossed plates or cards, they differ in construction as dictated by the specific application for which they are used. For example, in credit transactions such as are commonly used in department stores, the data recorder is utilized to imprint the customer's name, address and account number from the embossed card onto a sales slip. In oil station applications the data recorders imprint all of the above data and, additionally, are usually provided with key set levers for imprinting variable data such as the money amount of the sale.

More recently data recorders have also been introduced to the financial market and in particular to the banking industry. These data recorders are used to imprint deposit slips and the like with the customer's name and account number from the embossed plastic card, and are also provided with a dater to imprint the date and an auxiliary embossed plate to validate the form. However, in order to permit automatic machine sensing of the imprinted forms, the American Banker's Association has adopted the use of a stylized set of characters to be used for imprinting the account number. These characters are referred to as magnetic ink character recognition symbols or, more briefly, MICR characters.

Although the use of MICR characters has greatly increased the speed and efficiency with which the imprinted forms can be sorted, a considerable amount of difficulty has been encountered in the imprinting of the MICR characters on the forms. In this connection, because of the critical tolerances required by the automatic sensing equipment to properly read the MICR characters, it is necessary that the characters be positioned within a certain limited area on the form, that they be of uniform density to provide the proper amount of magnetic pigment deposition on the form to obtain a strong signal when being sensed, and that they be free of ragged or jagged outlines which might cause spurious signals resulting in erroneous reading and sorting operations. The present invention will be described in terms of these MICR characters, but it will be understood that characters intended for optical recognition and other types of critical reading characters are also comprehended.

Heretofore several improvements have been made to data recorders for imprinting forms and documents with machine scannable data, as well as to the forms utilized with these recorders. The improvements to the data recorders comprise such things as compensating platens or anvils to obtain a uniform degree of printing pressure even though the thicknesses of the embossed card and/or the form may vary from one application to another. Still other features include means to raise the platen after the form is imprinted to prevent double imaging of the form when the platen is restored to its start position.

A recently designed form which has proven successful in MICR imprinting applications is disclosed in U.S. Patent No. 3,113,516. As shown therein, the form comprises a carbon interleaved set in which one of the sheets is provided with a magnetic coating and the sheet immediately above the coated sheet in the set is provided with a notch die cut into one of its edges. In this way the back side of the coated sheet is exposed at the top of the set and, in the area of the notch, is the uppermost sheet in the set. In use, the form is placed in the data recorder with the notch in registry with the embossed MICR characters on the plastic card and the back side of the coated sheet in contact with the characters. When an impression is made, the platen pressure in the area of the notch is applied to the coated sheet and, as a result of the decreased thickness of the form set in the area of the MICR characters, the image created on the second sheet of the set is one having the clarity and sharpness required for automatic reading.

Although the foregoing improvements have met with a certain amount of success, it is an object of the present invention to further advance current practices of imaging form sets with characters having a high degree of clarity and outline accuracy through the use of small data recorders.

Another object of the present invention is to provide a data recorder for imprinting form sets from a printing plate having conventional embossed characters thereon as well as embossed coded data in such a way that the form set is imprinted to give an impression whose sharpness and clarity meets automatic reading requirements.

According to the present invention the foregoing objects are attained by providing a data recorder for imprinting a form set from a printing plate having two distinct groups of embossed characters thereon. The data recorder is provided with dual roller platens which are independently operative to imprint one group of characters with one of the platens when the platens are moved in a first direction across the form, and to imprint the other group of characters with the other platen when the platens are moved in the opposite direction across the form. In particular one of the platens is arranged to come into printing relation with a single line only of MICR type and to roll therealong from end to end without reaching any adjacent line of type. The uniformity of the pressure thus applied to the form set and embossed plate by the dual platen arrangement provides a clear, dense image of the MICR type on the form, which image is free of ragged outlines and has the degree of clarity and sharpness required for automatic reading.

It will be found that impressions made in this manner have a quality substantially equivalent to imprints made directly from inked type and, when the imprinted form is used as an input document for data processing equipment, the impression thereon will be accurately interpreted by the data processing equipment.

Other objects, features and advantages of the present invention will be apparent from the following description and claims and are illustrated in the accompanying drawings which, by way of illustration, show a preferred embodiment of the present invention and the principles thereof now considered to be the best mode contemplated for applying these principles. Other embodiments of the invention embodying the same or equivalent principles may be used and structural changes may be made as desired by those skilled in the art without departing from the present invention and the purview of the appended claims.

Figure 7:
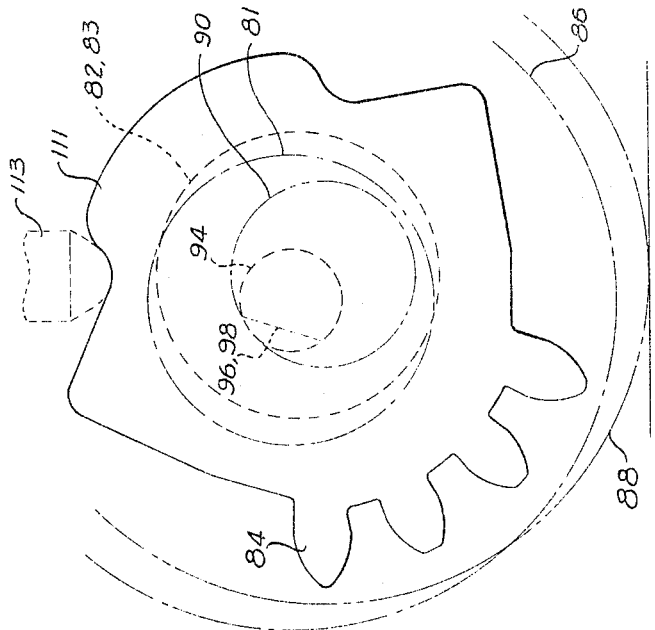
Figure 8:
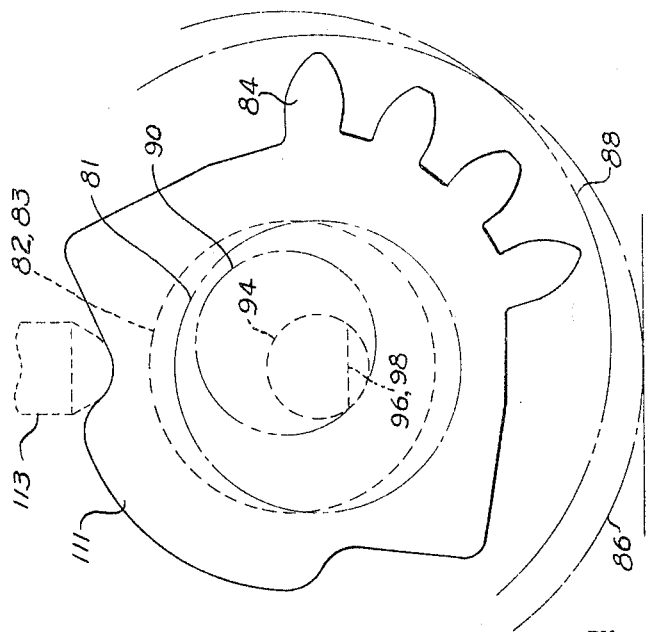

FIG. 7 is a diagrammatic end view on an enlarged scale showing the positions of the platen roller assembly and related positions of eccentrics associated with the assembly during the return stroke of the platen carriage and just before the forward stroke is started; and FIG. 8 is a view similar to FIG. 7 showing the positions of the parts during the forward stroke of the platen carriage, and just before the return stroke is started.

The platen construction of the present invention provides a relatively simple arrangement which can be incorporated in various types of data recorders. For purposes of this specification, the novel arrangement is described as being incorporated in a machine such as shown and described, for example, in U.S. Patent No. 3,018,725. To the extent that it assists in understanding the description of the invention to be set forth is detailed hereinbelow, the disclosure in the patent is incorporated herein.

Figure 1:
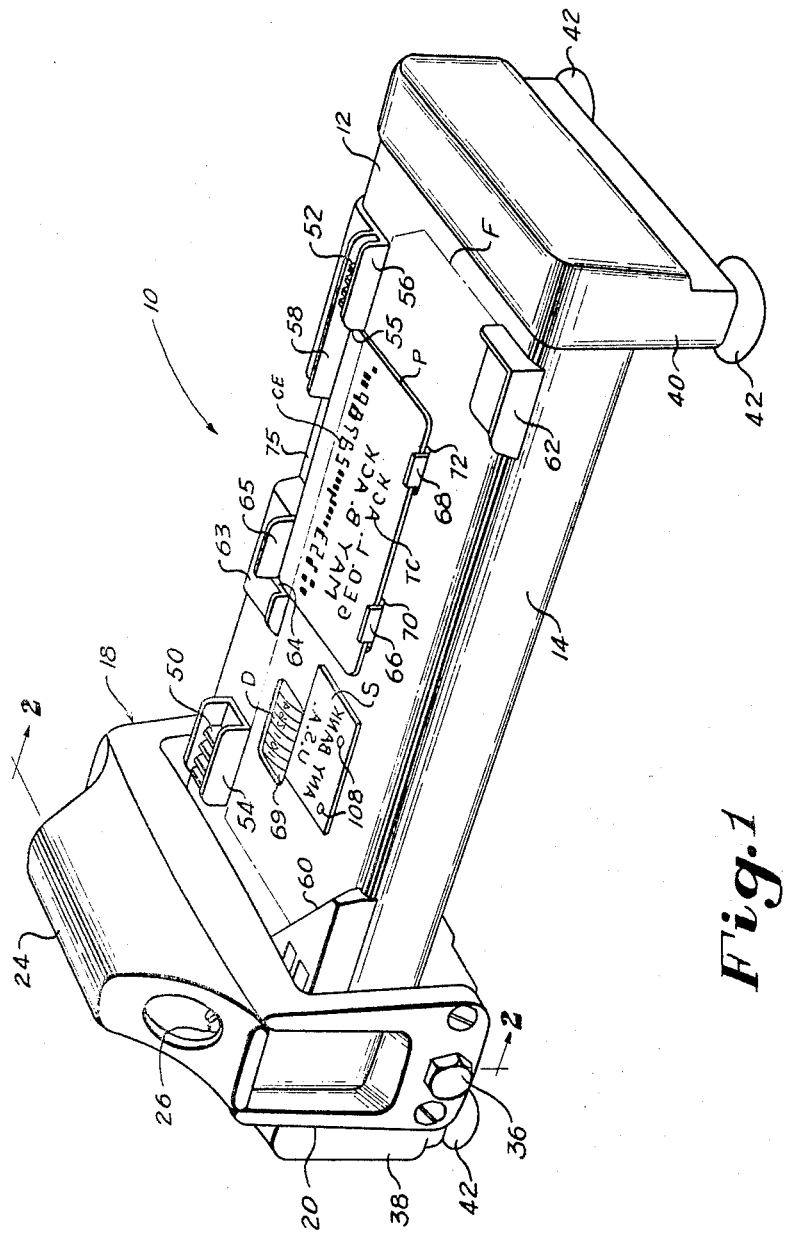
FIGURE 1 is a perspective view of a printing machine constructed in accordance with the present invention.

The data recorder of the present invention is shown generally at 10 in FIG. 1, and is adapted to produce impressions on a form from a printing plate P provided with embossed printing type characters TC and code embossures CE in the form of MICR characters. Since the data recorder of the present invention, with the exception of the platen roller assembly, is substantially the same as disclosed in the aforementioned Patent No. 3,018,725, only a brief description of the machine will be given herein.

Figure 2:
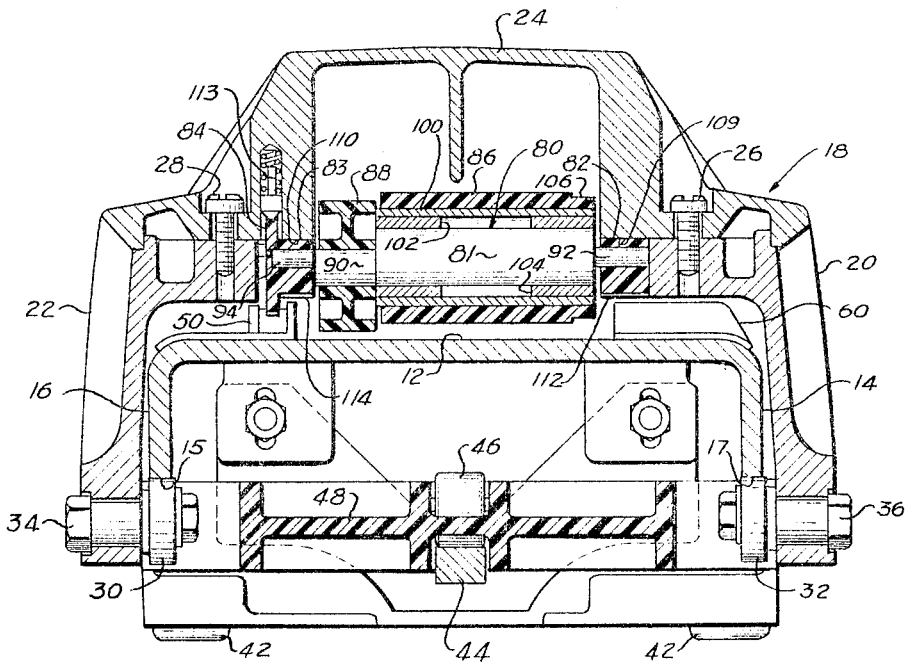
FIG. 2 is a sectional view on an enlarged scale taken substantially on line 2—2 of FIG. 1.

With reference to FIG. 1 of the drawings, the data recorder comprises a bed having a top surface 12 provided with depending side walls 14 and 16 as shown in FIG. 2. The platen roller assembly is rotatably mounted in a carriage 18 having sides 20 and 22, FIGS. 1 and 2, and a handle portion 24 which is fastened to the carriage by means of screws indicated at 26 and 28. Sides 20 and 22 are each provided with a roller, designated 32 and 30 respectively, rotatably mounted on eccentric screws 36 and 34 respectively. The rollers are adapted to ride on edges of rails 17 and 15 of the side walls 14 and 16 respectively when the carriage is moved from one end of the machine to the other to produce an impression on the form. The eccentric mounting of the rollers 30, 32 permits adjustment of the platen roller in relation to the top surface 12 of the bed, thereby permitting adjustment to accommodate varying thicknesses of printing plates and forms.

In stabilizing and rigidly supporting the bed, resort is had to a pair of end cover caps 38 and 40 which afford the standards or legs for the machine. The end caps may also be provided with rubber feet as shown at 42 to prevent the machine from movement during an imprinting operation. At the same time, the end caps serve to support an elongate carriage guide rail 44 shown in FIG. 2. A pair of rollers 46 (only one being shown in FIG. 2) are rotatably mounted in a carriage guide 48, and cooperate with the guide rail 44 to guide and support the platen carriage for movement parallel to itself. The mechanism thus far described is fully disclosed in detail in the aforementioned patent.

The top surface 12 of the bed, as shown in FIG. 1, is provided with elements for activating a movable member, as will be explained hereinafter, comprising a pair of spaced racks 50 and 52. Rack 50 has an upstanding gauge surface 54 and rack 52 has gauge surfaces 55, 56 and 58 for the purposes to be explained below. Also affixed to the top surface 12 of the bed, at the side opposite the rack elements, are a pair of corner gauges 60 and 62. A further corner gauge 63 is positioned on top surface 12 at a position intermediate the rack elements and has a guide surface 65 in line with gauge surface 58 of the rack element 52 and a guide edge 64 hereinafter described. A pair of gauges 66 and 68, made of spring steel, are mounted to the underside of the bed and extend upwardly through openings 70 and 72 provided in top surface 12. These gauges are thus resiliently mounted so as to be depressed by the roller platen when the carriage is moved across the bed to imprint the form set. An embossed validating or station plate S is also attached by means 108 to the top surface of the bed at a position adjacent a dater D which is mounted to the underside of the bed and protrudes through an opening 69 in the top surface 12. Both the station plate and the dater are provided with reverse or printing type characters.

As will be seen in FIG. 1, printing plate P is accurately registered and held in place on the bed by being positioned between gauge surfaces 58, 65 and spring gauges 66 and 68, with one corner of the plate abutting edge 55 of the gauge 56 and another corner of the plate abutting edge 64 of the corner gauge 63. A form F to be imprinted, such as disclosed, for example, in the aforementioned Patent No. 3,113,516, is placed on the bed to overlie the printing plate P, station plate S and dater D, and is retained in registered position by the corner gauges 60, 62 and gauge surfaces 54 and 56 of the rack elements. To facilitate the placement and removal of the plate P and form F onto and from the bed of the machine, a cutout or recess 75 is provided at one side of the bed as shown in FIG. 1.

Figures 3, 4, 5:
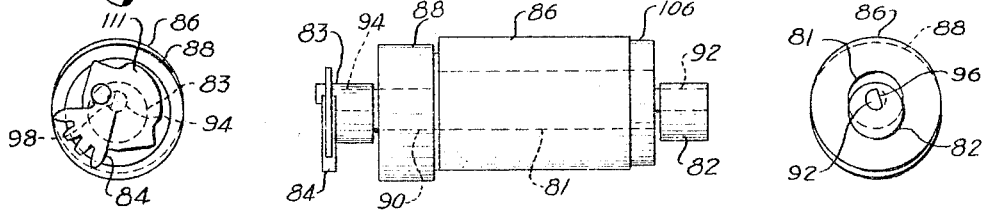
FIG. 3 is a front elevation of a platen roller assembly and certain associated parts.
FIG. 4 is a left-hand view of the platen roller assembly shown in FIG. 3.
FIG. 5 is a right-hand view of the platen roller assembly shown in FIG. 3.
Figure 6:
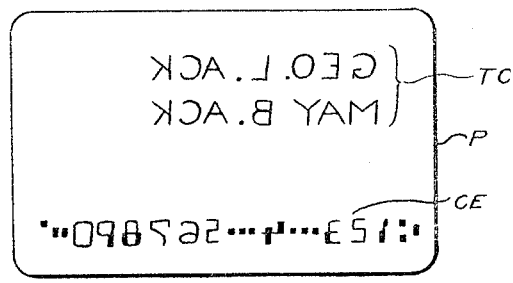
FIG. 6 is a plan view of an embossed printing plate to be used in the present machine.

The novel platen roller assembly of the present invention is best shown in FIGS. 2 and 3 and comprises an axle indicated generally at 80, bushings 82 and 83, a movable member in the form of a segment gear 84, and a pair of platen rollers 86 and 88, platen 88 being of the same diameter as platen 86 but substantially shorter in length. Axle 80 comprises a pair of shaft sections 81 and 90, and a pair of ends subs 92 and 94 which project outwardly beyond the ends of the platen rollers 86 and 88 respectively. Shaft section 90 is eccentric to shaft section 81 and end stubs 92 and 94 are concentric to shaft section 81. The free ends of the stubs 92 and 94 are flattened at faces 96 and 98 as shown in FIGS. 4, 5, 7 and 8 for a purpose to be described hereinafter.

The bore of the platen roller 86 is lined with a solid sleeve 100 having a knurled fit to the bore of the platen roller, and bushings 102, 104 are mounted in the bore of the sleeve 100 at the two ends thereof, whereby the platen roller 86 is supported for free rotation relative to the shaft section 81. Platen 86 is further provided with a turned down annular end as shown at 106 in FIG. 2, which provides clearance for station plate retaining means 108 when the platen is moved across the plate to effect an imprinting operation. Platen roller 88 is provided with a smooth bore and is mounted for free rotation on shaft section 90 of the axle 80.

Stub 92 is pressed into an eccentric opening in bushing 82, having a flat section for drivingly engaging flat 96 on stub 92, and the other stub 94 is pressed into bushing 83, having a flat section for drivingly engaging flat 98 on stub 94. The bushing 83 is preferably molded integral with segment gear 84. The bushings 82 and 83 are supported for free turning movement in split bearing surfaces provided by downwardly facing arcuate surfaces 109 and 110 at spaced locations within the platen handle 24, and mating upwardly facing arcuate bearing surfaces 112 and 114 formed, for example, by straps secured to the under side of the platen carriage as indicated in FIG. 2.

Thus, it will be seen that shaft section 81 and platen roller 86 carried thereby are eccentrically arranged with respect to the bushing elements 82 and 83, and that platen 88 carried by shaft section 90 is also eccentrically arranged with respect to bushing elements 82 and 83 but in a different radial direction.

The angular relationship of these eccentricities is such that the bushing elements and the axle constitute eccentric actuating means for the platens, so that by rotating the bushing elements 82 and 83, the axes of the platen rollers can be vertically shifted as will be explained hereinbelow. This shifting action of the platen rollers is afforded in order that one of the platens will be disposed in an effective position tangent to the imprinting plane during the forward stroke of the platen carriage, and that this platen will be raised to an ineffective position and the other platen lowered to an effective or imprinting position during the return stroke of the platen carriage.

The shifting of the platen rollers during the course of an imprinting operation is under control of the segment gear 84 in a manner similar to that described in the aforementioned patent. With reference to FIGS. 1 and 2, the platen carriage is shown in its home position wherein platen roller 88 is disposed in an imprinting level and roller 86 is in an ineffective level. In this position of the platen carriage, segment gear 84 (as viewed in FIG. 4 or as seen from the left in FIG. 2) is disposed as shown in FIG. 7. As the platen carriage is moved from left to right in FIG. 1 (in other words, from right to left when viewing FIG. 2 from the left hand side), the teeth of segment gear 84 first engage rack 50 on the bed of the machine. This engagement rotates bushing element 83 and, through the flat driving connections 96, 98, the bushing 82 in a counterclockwise direction as viewed in FIG. 7. Because of the driving connection between the bushings and the end stubs of the axle 80, the platen roller assembly is, of course, also rotated with the bushing elements.

As the teeth of the segment gear 84 leave the rack 50, the segment gear and platen rollers have been rotated a little over 100° to the positions shown in FIG. 8. It will be observed that in this position shaft section 81 is lowered and shaft section 90 is raised thereby disposing platen roller 86 at an imprinting level and platen roller 88 at an ineffective level. Continued movement of the platen carriage across the bed of the machine is effective to imprint the form from the embossed data TC on the plate P, as well as from the station plate S and the dater D, utilizing platen roller 86. As the platen carriage reaches the right hand end of the machine as viewed in FIG. 1, the lead tooth on segment gear 84 merely idles over the rack 52 and no significant motion is imparted to the platen roller assembly. At this stage of operation, the platen roller assembly and related parts are in the positions shown in FIG. 8.

On the return stroke of the platen carriage, segment gear 84 engages rack 52 and rotates the platen assembly in a clockwise direction as viewed in FIG. 8. Thus, shaft section 90 is lowered and shaft section 81 is raised thereby disposing platen roller 88 at an imprinting level and platen roller 86 at an ineffective level. As the platen carriage continues to be moved across the bed of the machine, platen roller 88 is effective to imprint the form from the embossed data CE on the plate P. Also, when the platen carriage approaches its home position, the lead tooth on segment gear 84 idles over rack 50 without imparting any rotation to the platen roller assembly. At the home position of the platen carriage, the segment gear and platen roller assembly are in the positions shown in FIG. 7 and are ready for another imprinting operation.

The gear segment 84 has formed thereon a detent configuration 111 which cooperates with a spring-pressed plunger 113 (FIG. 2) to provide for releasable retaining the platen assembly in either of its terminal positions similar to the arrangement shown in U.S. Patent 3,018,725.

From the foregoing, it will be appreciated that platen roller 86 is effective to imprint the form from the embossed data such as TC on plate P, as well as from the station plate S and the dater. The imprinting of these data takes place when the platen carriage is moved from left to right as viewed in FIG. 1, during which time platen 88 is raised. The return stroke of the platen carriage raises platen roller 86 out of printing engagement with the form and the printing devices and, at the same time, lowers platen roller 88 into printing engagement with the form to effect imprinting from the embossed MICR characters on plate P.

This novel, dual-platen roller construction of the present invention has been found to produce extremely high quality impressions on carbon interleaved forms or, more particularly, on forms interleaved with magnetically coated sheets. These results are achieved through the use of a dual platen roller assembly wherein the printing of the MICR characters is accomplished by rolling line contact and under circumstances such that the printing pressure on the embossed MICR characters is not influenced by any parallel embossed lines on the printing plate. Accordingly, the impression made from the MICR characters utilizing a separate roller platen rolling lengthwise of the line of characters, is of a quality such that when the imprinted form is used as an input document for data processing equipment, the impression thereon has the clarity and sharpness to afford accurate interpretation by the data processing equipment.

While the preferred embodiment of the invention has been described and illustrated, it is to be understood that this is capable of variation and modification. Accordingly, the aim in the appended claims is to cover all such variations and modifications as may fall within the true spirit and scope of the invention.

What is claimed is:

1. A printing machine of the character described comprising means for holding a printing device in printing position in a plane; a platen carriage reciprocable adjacent said printing position in a path substantially parallel to the plane of the printing device; two roller platens rotationally supported on said carriage in end-to-end relation with their axes extending transversely of the direction of carriage motion and each movable between an extended position relative to said carriage in which its axis is shifted towards the plane of the printing device and a retracted position relative to said carriage in which its axis is more remote from the plane of the printing device than said extended position; means for shifting either platen to one or the other of said extended and retracted positions and simultaneuosly shifting the other of said platens to the opposite position; and means adjacent the carriage when the same is at each end of its path for operating said shifting means so that one platen is extended during motion of the carriage in one direction and the other is extended during motion of the carriage in the other direction.

2. A printing machine of the character described comprising means for holding a printing device in printing position in a plane; a platen carriage reciprocable adjacent said printing position in a path substantially parallel to the plane of the printing device; two roller platens rotationally supported on said carriage in end-to-end relation with their axes extending transversely of the direction of carriage motion and each movable between an extended position relative to said carriage in which its axis is shifted towards the plane of the printing device and a retracted position relative to said carriage in which its axis is more remote from the plane of the printing device than said extended position; means for shifting either platen to one or the other of said extended and retracted positions and simultaneously shifting the other of said platens to the opposite position; said last-mentioned means comprising eccentric actuating means between said platens and the carriage, a movable member associated with said actuating means and bodily movable with the carriage, and a pair of activating elements cooperable with said movable member, one located adjacent each end of the platen carriage path.

3. A printing device as set forth in claim 2 in which the platens are mounted on an axle supported on the carriage for rocking motion about a fixed axis, and in which the eccentric actuating means comprises two portions of the axle eccentrically disposed with respect to said axis and each other.

4. A printing device as set forth in claim 3 in which the eccentric actuating means comprises an axle with end stubs; and a shaft portion for one platen coaxial with said end stubs; a shaft portion for the other platen eccentrically arranged with respect to said end stubs and bushings drivingly and eccentrically arranged on said end stubs.

5. A printing device as set forth in claim 4 in which the movable member is integrally formed with one of said bushings.

6. A printing device as set forth in claim 2 in which the movable member integrally associated with one of the bushings comprises a segment gear, and the activating elements include a pair of racks arranged to mesh with said segment gear.

7. A method of making an impression on a form set from an embossed printing device which utilizes a carriage movable in opposite directions between a first and a second position and having a pair of roller platens rotatably supported thereon, rolling one of the platens in printing relation to one portion of the printing device with the other platen in non-printing relation to another portion of the printing device when the carriage is moved in one direction, and rolling the other platen in printing relation to the other portion of the printing device with said one platen in non-printing relation to said one portion when the carriage is moved in the opposite direction.

References Cited by the Examiner

UNITED STATES PATENTS

| | | | |
|---|---|---|---|
| 1,801,594 | 4/1931 | Dugdale | 101—274 |
| 2,043,600 | 6/1936 | Ward | 101—56 |
| 2,104,863 | 1/1938 | Hueber | 101—274 |
| 2,923,234 | 2/1960 | Werner et al. | 101—274 |
| 3,004,487 | 10/1961 | Herbert | 101—269 |

WILLIAM B. PENN, *Primary Examiner.*